United States Patent [19]

Giuliano et al.

[11] 4,047,152
[45] Sept. 6, 1977

[54] ELECTRONIC CHARACTER-READING SYSTEM

[75] Inventors: Ercole Giuliano, Genova; Orazio Paita, La Spezia; Luigi Stringa, Arenzano-Genova, all of Italy

[73] Assignee: Elettronica San Giorgio - ELSAG - S.p.A., Genova-Sestri, Italy

[21] Appl. No.: 738,456

[22] Filed: Nov. 3, 1976

[30] Foreign Application Priority Data

Nov. 3, 1975 Italy .................................. 69715/75

[51] Int. Cl.$^2$ .............................................. G06K 9/00
[52] U.S. Cl. ................ 340/146.3 AG; 340/146.3 MA
[58] Field of Search ............. 340/146.3 AG, 146.3 H, 340/146.3 MA; 358/133, 163, 166, 168, 169, 284

[56] References Cited

U.S. PATENT DOCUMENTS

| | | | |
|---|---|---|---|
| 3,737,855 | 6/1973 | Cutaia | 340/146.3 AG |
| 3,778,768 | 12/1973 | Brisk et al. | 340/146.3 AG |
| 4,003,024 | 1/1977 | Riganati et al. | 340/146.3 MA |

OTHER PUBLICATIONS

Stamopoulos, "Parallel Image Processing", *IEEE Transactions on Computers*, vol. C-24, No. 4, Apr. 1975, pp. 424–433.

*Primary Examiner*—Leo H. Boudreau
*Attorney, Agent, or Firm*—Karl F. Ross

[57] ABSTRACT

A set of photoelectric transducers, optically scanning a line transverse to the direction of movement of a character-bearing document to be electronically read, is periodically actuated to pick up light from a multiplicity of elemental areas of that document and to generate electrical analog voltages commensurate with the brightness of these areas. The analog voltages are serially read out from one or more shift registers as a pulse train or several parallel pulse trains each undergoing digitization and subsequent storage in respective cells of an associated memory. A group of these cells contain, at a given instant, digital codes representative of the relative brightness of respective elemental areas othogonally arrayed in a square surface portion of the document divided into a middle zone and four diagonally adjoining peripheral zones, the middle zone being centered on the point currently scanned. The relative brightness of that scanned point is weighted by an adaptive field function, based on the relative brightness of the peripheral areas, to yield a responsive parameter whose joint evaluation with the relative brightness of the scanned point yields a binary output signal. A series of such output signals, derived from simultaneous readings of a corresponding number of adjoining transducers, is converted into a multibit word fed to a utilization circuit.

15 Claims, 8 Drawing Figures

ELECTRONIC CHARACTER-READING SYSTEM

FIELD OF THE INVENTION

Our present invention relates to an electronic character-reading system designed to translate alphanumerical symbols, drawings or the like, written or printed on a continuously moving carrier, into electrical pulses to be transmitted, for example, to a remote location for facsimile reproduction.

BACKGROUND OF THE INVENTION

Reading stations of facsimile transmitters generally comprise photoelectric sensors which respond to the differences in brightness between the background of the carrier surface and the graphic characters appearing thereon, the latter being usually of reduced luminosity. It is customary to measure relative brightness, or image contrast, rather than absolute brightness in order to take luminosity of the background into account. Such a sensor produces a signal voltage of analog type which can be converted, by comparison with a threshold, into a binary output signal whose two levels characterize the various elemental areas of the explored carrier surface as being of either high ("white") or low ("black") luminous intensity.

If the contrast level is high enough, e.g. on the order of 0.4 to 0.6, conventional systems operating with photoelectrictransducers perform quite satisfactorily. If this requirement is not fulfilled, scanning by a video camera may be used to allow electronic intensification of contrasts; such systems, however, are complex and costly, apart from necessitating frequent readjustments and recalibrations. Similar drawbacks are encountered in systems in which the documents are scanned by a laser beam. There is also the disadvantage that the document must be stationary during scanning, thus permitting only an intermittent advance with resulting strain on the transport mechanism and noisy operation.

OBJECTS OF THE INVENTION

The general object of our present invention, therefore, is to provide an improved method of and system for electronically reading written or printed characters with enhancement of contrast, even where the brightness difference is as low as 0.2, by an algorithm realizable with relatively simple logical circuitry.

Another object is to simplify the electronic reading of characters on a continuously moving carrier.

SUMMARY OF THE INVENTION

According to our present invention, a set of photoelectric transducers are illuminated with light from respective elemental areas or dots adjoining one another along a line substantially perpendicular to the direction of motion ($x$) of a carrier to be scanned, referred to hereinafter as a document; a timer establishes a succession of operating cycles of a duration so related to the speed of the unidirectionally moving document that the advance of that document during each cycle is on the order of magnitude of width of an elemental area in the direction ($y$) of the aforementioned line. From the signal voltages generated by these transducers, and from a reference voltage which may be produced by a peak detector, a converter derives a set of electricalquantities — referred to hereinafter as codes — which are representative of the image contrasts existing in the respective elemental areas. The codes are stored in a memory in such a way that, during each phase, access is had to the codes derived from the signal voltages of a plurality of transducers optically registering with a two-dimensional array of elemental areas on the document surface, preferably within a square area of $n \times n$ elemental areas. This array includes a first or inner zone, preferably a square of $(n \times m) \times (n-m)$ elemental areas, containing a central elemental area which is the one to be evaluated in the phase here considered and whose code is therefore considered the most significant; the array further includes a second or outer zone composed of several peripheral elemental areas, that zone being divided into preferably 4 squares of $(m/2) \times (m/2)$ elemental areas diagonally adjoining the square of the inner zone. Groups of codes stored in different stages of the memory, relating to the elemental areas of the first and the second zone, are separately extracted and weighted with a contrast-enhancing field function as more fully described hereinafter. A response parameter, synthesized from the weighted codes, is used for evaluating the most significant code to produce a binary output signal.

The several output signals produced in a single operating cycle may be grouped into one or more multibit words read out, after interim storage, to a utilization circuit such as a facsimile transmitter.

In the case of documents whose width in the $y$ direction is considerable, it will be advantageous to divide the set of photoelectric transducers and associated circuits into several sections constituting parallel signal paths. With each sensing section scanning a relatively narrow strip zone of the document, cross-connections between homologous elements (especially arithmetic units) of adjoining signal paths will be necessary to facilitate evaluation of the response parameter for arrays of elemental areas or dots straddling a pair of neighboring strip zones.

BRIEF DESCRIPTION OF THE DRAWING

The above and other features of our invention will now be described in detail with reference to the accompanying drawing in which.

SPECIFIC DESCRIPTION

The reading system according to our invention performs essentially the following sequence of operations:

a. calculation of a contrast function S representing relative brightness at a given point;

b. calculation of a contrast-enhancing field function $\phi$, based on the brightness of the surroundings of the given point, to weight the contrast function S;

c. calculation of a response parameter R from the values of functions S and $\phi$;

d. evaluation of the contrast function S jointly with the response parameter R; and e. conversion of the result into binary (yes/no) form.

Figure 1:
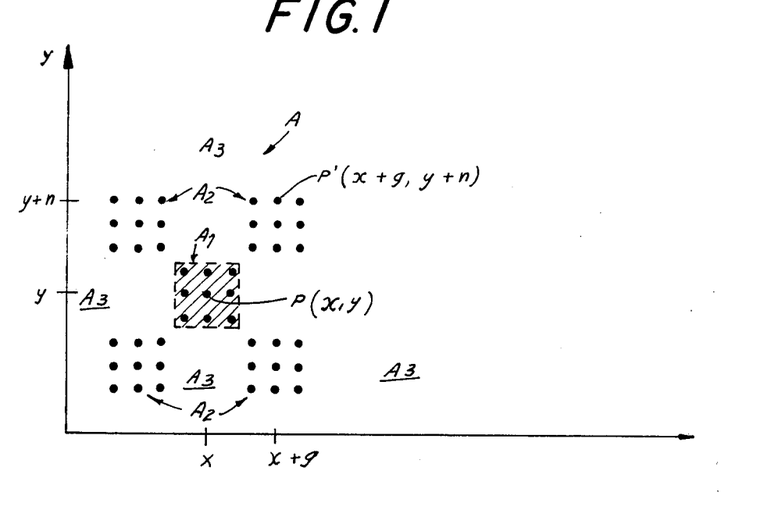
FIG. 1 is a diagram illustrating the division of a document into elemental areas grouped in inner and outer zones about a scanning point.

In FIG. 1 we have shown the path of a document or other carrier, not further illustrated, which is assumed to be moving continuously in a direction $x$ past a photoelectric sensor FS (FIG. 3) consisting of an array of elemental transducers, such as photocells, extending in an orthogonal direction $y$. Within a period of 9 operating cycles, of a duration depending upon the speed of the document, any group of 9 adjacent transducers will sweep a square array A consisting of 9 × 9 horizontally and vertically coextensive elemental areas referred to hereinafter as dots. The middle part of array A, consisting of 3 × 3 dots, has been labeled $A_1$ and contains at its center a point $P(x,y)$ whose brightness is to be explored in a given phase of one of these cycles. Zone $A_1$ diagonally adjoins four other zones collectively designated $A_2$, each of them encompassing an area of the same size as zone $A_1$ (though this is not essential) with points P' $(x+g, y+h)$ whose brightness is to be determined for purposes of comparison. Other surface areas, including the gaps which exist between zones $A_2$, have been designated $A_3$ and are considered part of the background.

The contrast function S is expressed by $$S(x,y) = \frac{I(x,y) - I_B}{I_B} \quad (1)$$

where $I(x,y)$ represents the absolute brightness of point P and $I_B$ is the luminosity of its surroundings.

The field function $\phi(g,h)$ at point $P'(x+g, y+h)$ may be defined in various ways depending upon the type of characters to be read. We prefer to use the following definition:

$$\phi(g,h) = \frac{K_1}{mesA_1} \quad (2a)$$

if $P'(x+g,y+h) \in A_1$, $$\phi(g,h) = 0 \text{ for } S(x+g, y+h) < \frac{K_2}{K_1} \quad (2b)$$

$$\phi(g,h) = -\frac{K_3 K_1}{mesA_2'} \text{ for } S(x+g, y+h) \geq \frac{K_2}{K_1} \quad (2c)$$

if $p'(x+g,y+h) \in A_2$, and $$\phi(g,h) = 0$$

if $P'(x+g,y+h) \in A_3$

In the foregoing equations, in conformity with the theory of sets, $\epsilon$ symbolizes "member of" whereas the operator mes designates "measured area". Thus, $mesA_1$ is the area of zone $A_1$; $mesA_2'$ is the area of that part of zone $A_2$ which is constituted by dots whose relative brightness satisfies the relationship $S \geq K_2/K_1$).

In these same equations, $K_1$ is a constant inherent in the system; $K_2$ and $K_3$ may be manually selected constants, though we prefer to make $K_2$ a variable parameter depending on the background noise.

Figure 2:
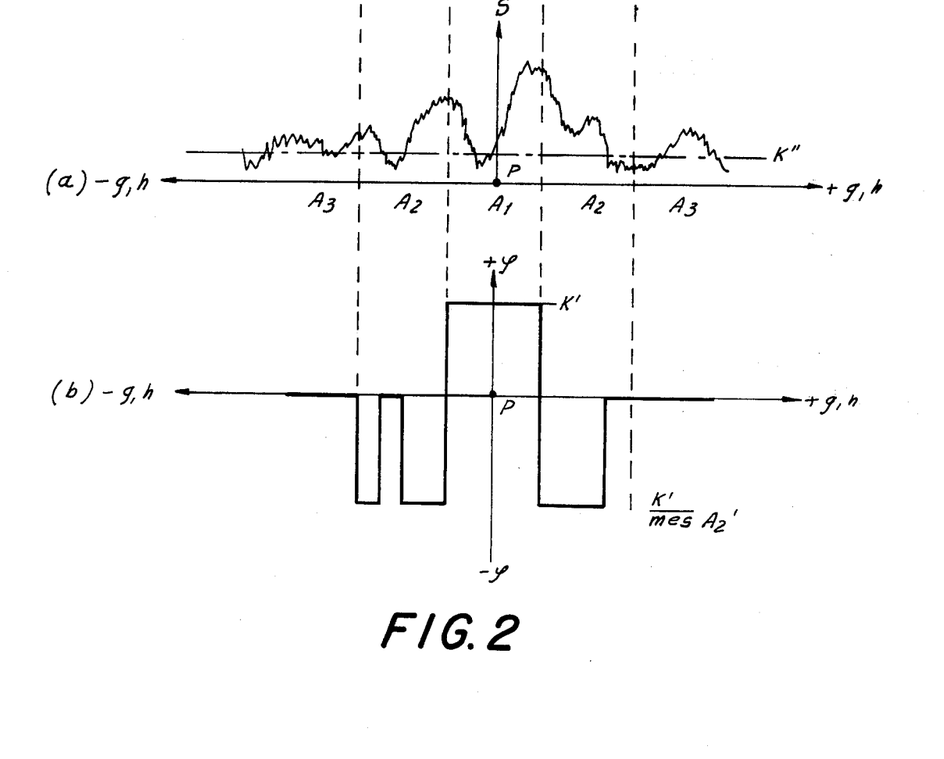
FIG. 2 is a set of graphs serving to explain the principle of contrast enhancement in a reading system according to our invention.

In a given system, with the extent of the inner zone $A_1$ (here 3 × 3 dots) fixed, the parameter $mesA_1$ will also be invariant. We can therefore simplify equations (2a), (2b) and (2c) as follows:

$$\phi(g,h) = K \text{ if } P'(x+g,y+h) \in A_1 \quad (2a')$$

$$\phi(g,h) = 0 \text{ for } S(x+g, y+h) < K'' \quad (2b')$$
$$\phi(g,h) = \frac{-K'}{mesA_2'} \text{ for } S(x+g, y+h) \geq K'' \quad (2c')$$
if $P'(x+g, y+h) \in A_2$ In graph (a) of FIG. 2 we have shown a possible course of contrast function S, plotted along a diagonal of area A (FIG. 1) over all three zones $A_1$, $A_2$ and $A_3$; graph (b) shows the corresponding magnitudes of the discontinuous field function $\phi$.

We can now define a response parameter $R(x,y)$ for the point $P(x,y)$ as the convoluted integral of the contrast and field functions, i.e.

$$R(x,y) = \int\int_{A_1 \cup A_2 \cup A_3} S(x + g, y + h) \phi(x + g, y + h) dg dh + K_4 \quad (3)$$

where U is the symbol for "union", as used in set theory, and $K_4$ is an integration constant.

By a joint evaluation of contrast function S and response parameter R, we can obtain a binary signal $z(x,y)$ defined as follows, using as a criterion a constant $K''' \equiv (K_5/K_1)$ where $K_5$ may be freely selectable constant or, preferably, a parameter depending on background noise (with $K_5 = K_2$ we have $K''' = K'$):

$$z(x,y) = 1 \text{ if } R(x,y) > 0 \text{ and } S(x,y) \geq K''' \quad (4a)$$

$$z(x,y) = 0 \text{ if } R(x,y) \geq 0 \text{ and } S(x,y) \geq K''' \quad (4b)$$

$$z(x,y) = 0 \text{ if } S(x,y) \leq K''' \quad (4c)$$

In view of the discontinuous nature of the field function $\phi$, the response parameter R can also be written as:

$$R(x,y) = K \int\int_{A_1} S(x + g, y + h) dg dh - \frac{K'}{mesA_2'} \int\int_{A_2'} S(x + f, y + h) dg dh + K_4 \quad (5)$$

From the foregoing equations and FIG. 2 it will be apparent that the algorithm discussed above serves to enhance the contrast by virtue of an adaptive filtering operation and not merely by a comparison with a fixed threshold level. Thus, the negative term of equation (5) is a function of the illumination of the area surrounding the point P whose relative brightness is to be evaluated.

Figure 3:
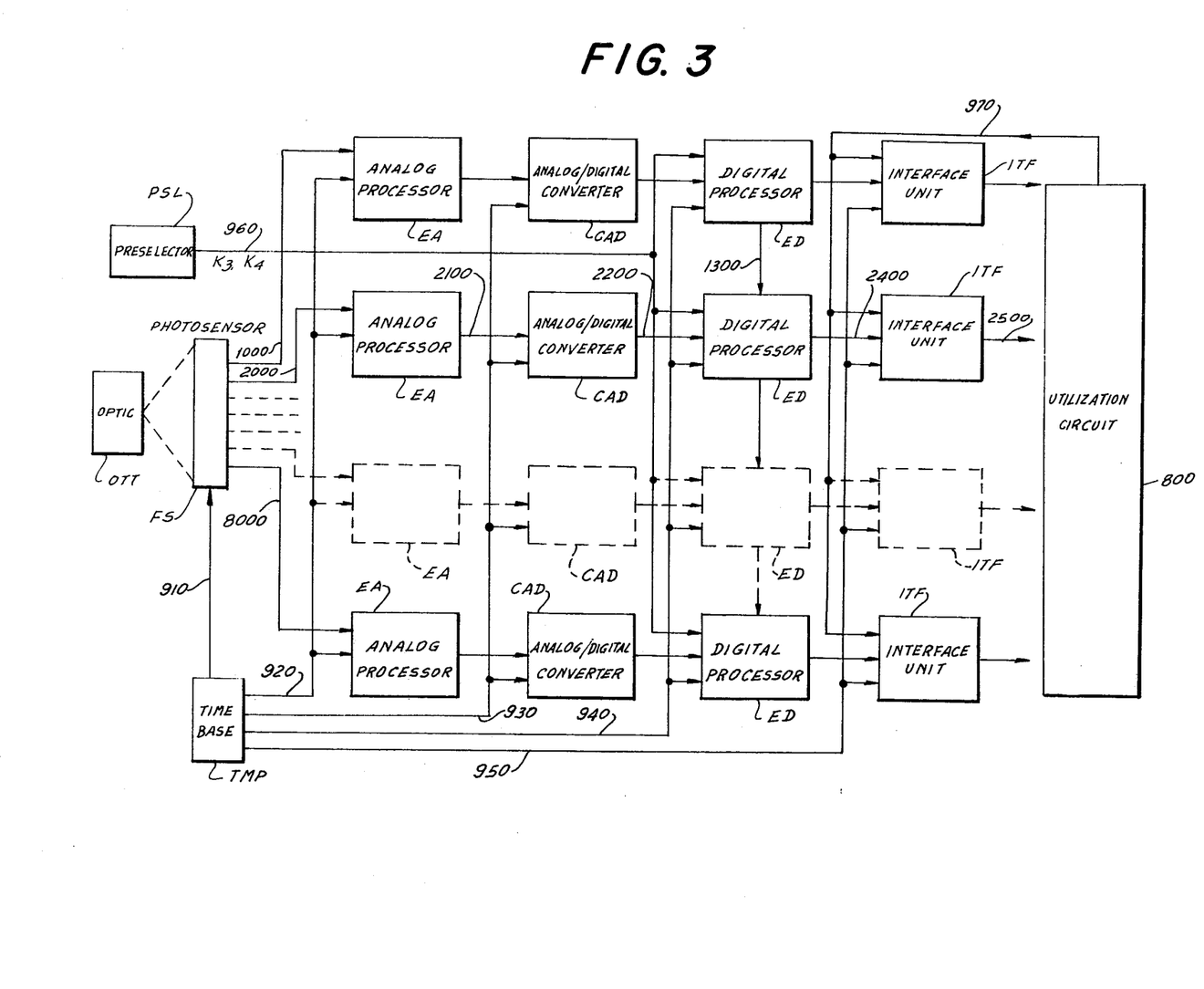
FIG. 3 is a block diagram of our improved reading system.
Figure 8:
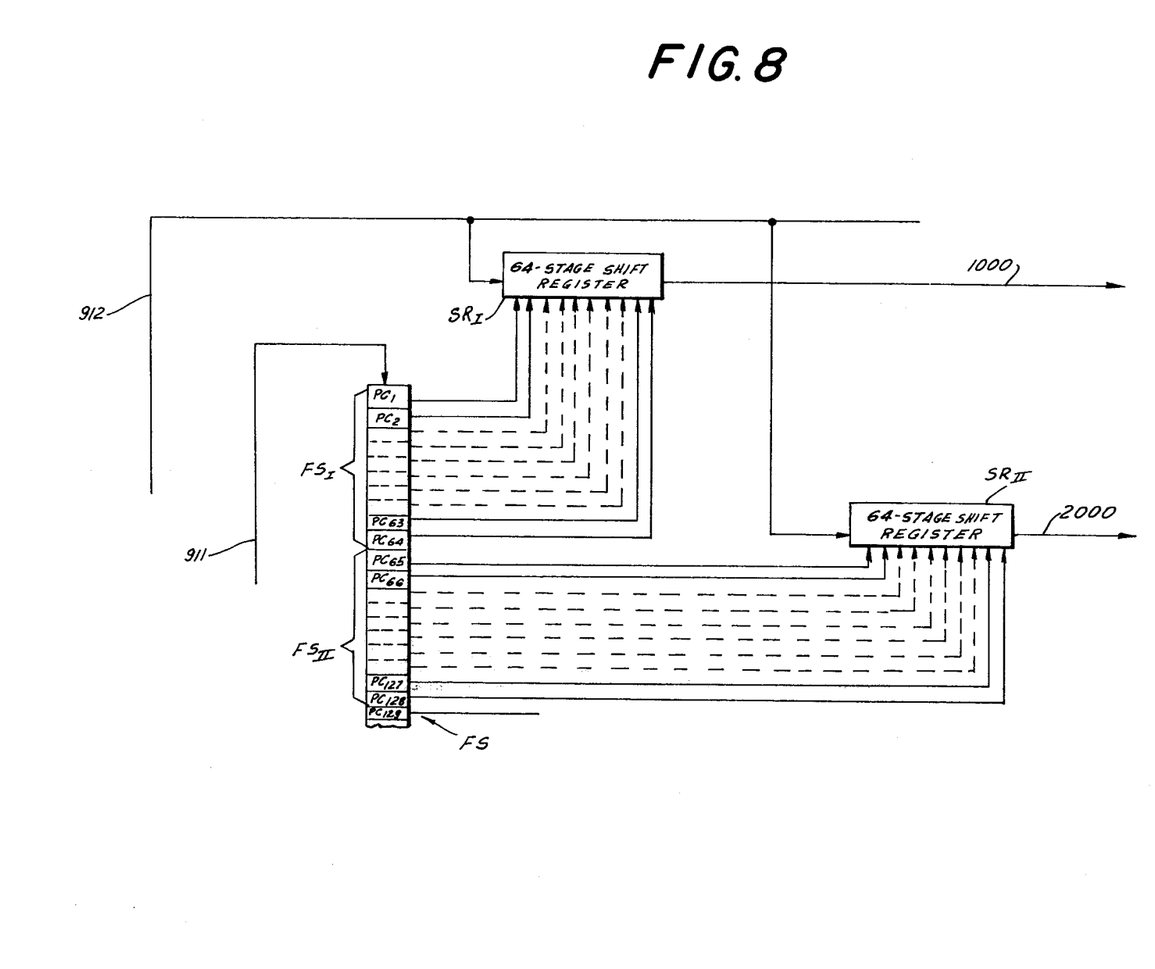
FIG. 8 shows details of a photoelectric sensor diagrammatically indicated in FIG. 3.

In FIG. 3 we have shown the overall layout of a reading system according to our invention. An optical device OTT, such as an objective provided with a slit diaphragm, overlies the path of the document to be scanned and focuses light from elemental areas of a continuously moving document onto respective photocells of a photosensor or scanner generally designated FS. The photocells, some of which have been illustrated at PC$_1$, PC$_2$ etc. in FIG. 8, are aligned with one another so as to register at any instant with respective dots disposed along a line perpendicular to the direction of motion, i.e. a line parallel to the ordinate axis y of FIG. 1.

In the present instance it will be assumed that there are 512 photocells divided into eight groups or subsets of 64 photocells each, these groups forming respective sections of photosensor FS. Two of these sections, designated FS$_I$ and FS$_{II}$, have been illustrated in FIG. 8 and are shown connected to respective stage inputs of associated 64-stage shift registers SR$_I$ and SR$_{II}$. Thus, photocells PC$_1$ – PC$_{64}$ work into register SR$_I$ while cells PC$_{65}$ – PC$_{128}$ work into register SR$_{II}$; the remaining cells PC$_{129}$ etc. similarly co-operate with six further shift registers not shown. The output leads of these eight shift registers have been designated 1000, 2000, ... 8000 in FIG. 3.

A time base TMP controls the photosensor or scanner FS via a conductor multiple 910 including a lead 911 for the concurrent actuation of all the photocells at the beginning of each cycle, another lead 912 stepping the shift registers SR$_I$ etc. during 64 phases of the cycle for a serial readout of their contents in the form of eight parallel pulse trains traveling over respective signal channels of identical construction. It will be evident that the 512 photocells could also be scanned with the aid of a single shift register, during 512 phases of a cycle, but that the cycle would then have to be eight times as long, with T = 512 t (where T is the cycle length and t is the duration of a phase) instead of T = 64 t as in the system actually shown. Naturally, other subdivisions for different modes of series/parallel readout can be devised, depending upon speed requirements and cost limitations.

The eight signal channels shown in FIG. 3, respectively fed by leads 1000 – 8000, are of identical construction and include each an analog processor EA, an analog/digital converter or quantizer CAD, a digital processor ED and an interface unit ITF in cascade, all these elements being controlled by respective output lines 920, 930, 940 and 950 of time base TMP. The several interface units ITF work into a utilization circuit 800 from which a line 970 extends to these units in order to control the discharge of outputs signals temporarily stored therein. As particularly illustrated for the second channel, fed by lead 2000, intercomponent connections 2100, 2200, 2300, 2400 and 2500 link the analog processor EA, the quantizer CAD, the processor ED and the interface unit ITF of each channel with one another and with utilization circuit 800. This second channel will be further described in detail, as representative of all the channels, with reference to subsequent Figures.

The several photosensor sections FS$_I$ etc. adjoin one another without intervening gaps so as to scan eight contiguous strip zones of the document moving in the direction x (FIG. 1). During any phase of a cycle, one point P(x,y) is scanned in each strip zone while the luminosity of the entire surrounding area A (FIG. 1) is being explored. When the scan reaches a point close to the boundary between strip zones, therefore, that surrounding area — i.e. the array of 9×9 dots in the present instance — will straddle two continuous strip zones so as to make necessary an exchange of information between neighboring channels. Such an exchange is facilitated by interchannel links, two of which have been designated 1300 and 2300 in FIG. 3.

Also illustrated in FIG. 3 is a preselector PSL with an output multiple 960 carrying the aforementioned constants K$_3$ and K$_4$ to the several processors ED. Preselector PSL may be manually adjusted according to the nature of the document being scanned.

Figure 4:
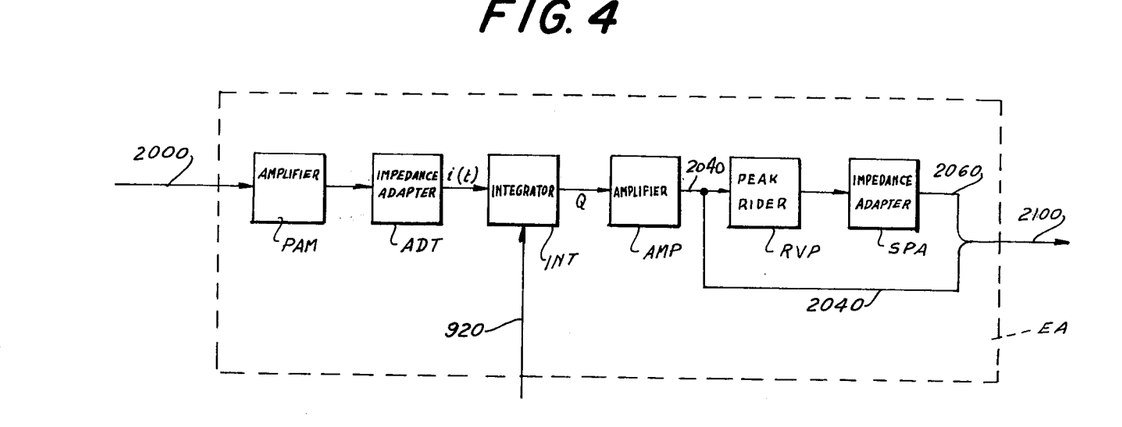
FIG. 4 is a more detailed diagram of an analog processor forming part of the system of FIG. 3.

In FIG. 4 we have shown details of the processor EA receiving input pulses from lead 2000. This processor comprises an amplifier PAM working into an impedance adapter ADT which, during each phase, feeds a voltage sample $i(t)$ to an integrator INT for conversion into a broadened signal $Q = i(t)dt$. The operation of integrator INT is controlled by a timing pulse arriving over conductor 920.

Analog voltage Q passes through another amplifier AMP whose output lead 2040 has a branch extending to a peak rider RVP; the latter has an output lead 2060 containing an impedance adapter and isolating amplifier SPT whose output lead 260 joins the lead 2040 within outgoing multiple 2100.

Figure 5:
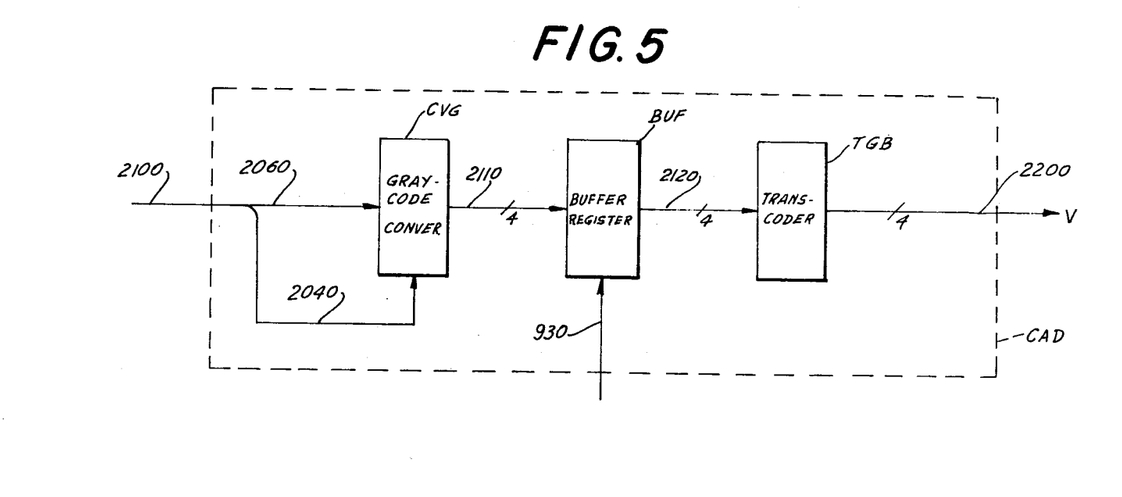
FIG. 5 is a more detailed diagram of an analog/digital converter of quantizer included in the system.

The quantizer CAD shown in FIG. 5 receives via lead 2040 the analog voltage Q from amplifier AMP and via conductor 2060 the output of peak rider RVP which is a reference voltage derived from the maximum signal amplitude detected within an extended period such as, for example, one operating cycle. Leads 2040 and 2060 terminate at a converter circuit CVG which translates the difference between that reference voltage and the suitably amplified signal voltage Q into a digital value, specifically a 4-bit Gray code designed to minimize errors of digitization. A multiple 2110, consisting of four conductors as conventionally indicated by a slanting stroke with the number 4 written next to it, carrier the four bits of this code to a buffer register BUF which stores them until the arrival of a timing pulse on lead 930. The bits are then read out over a similar multiple 2120 to a transcoder TGB for conversion into an ordinary (nonreflected) binary code. That code, designated $v$, appears on the output multiple 2200 of quantizer CAD extending to processor ED. Code $v$, when complemented to 1, is proportional to the image contrast as defined by equation (1).

Figure 6:
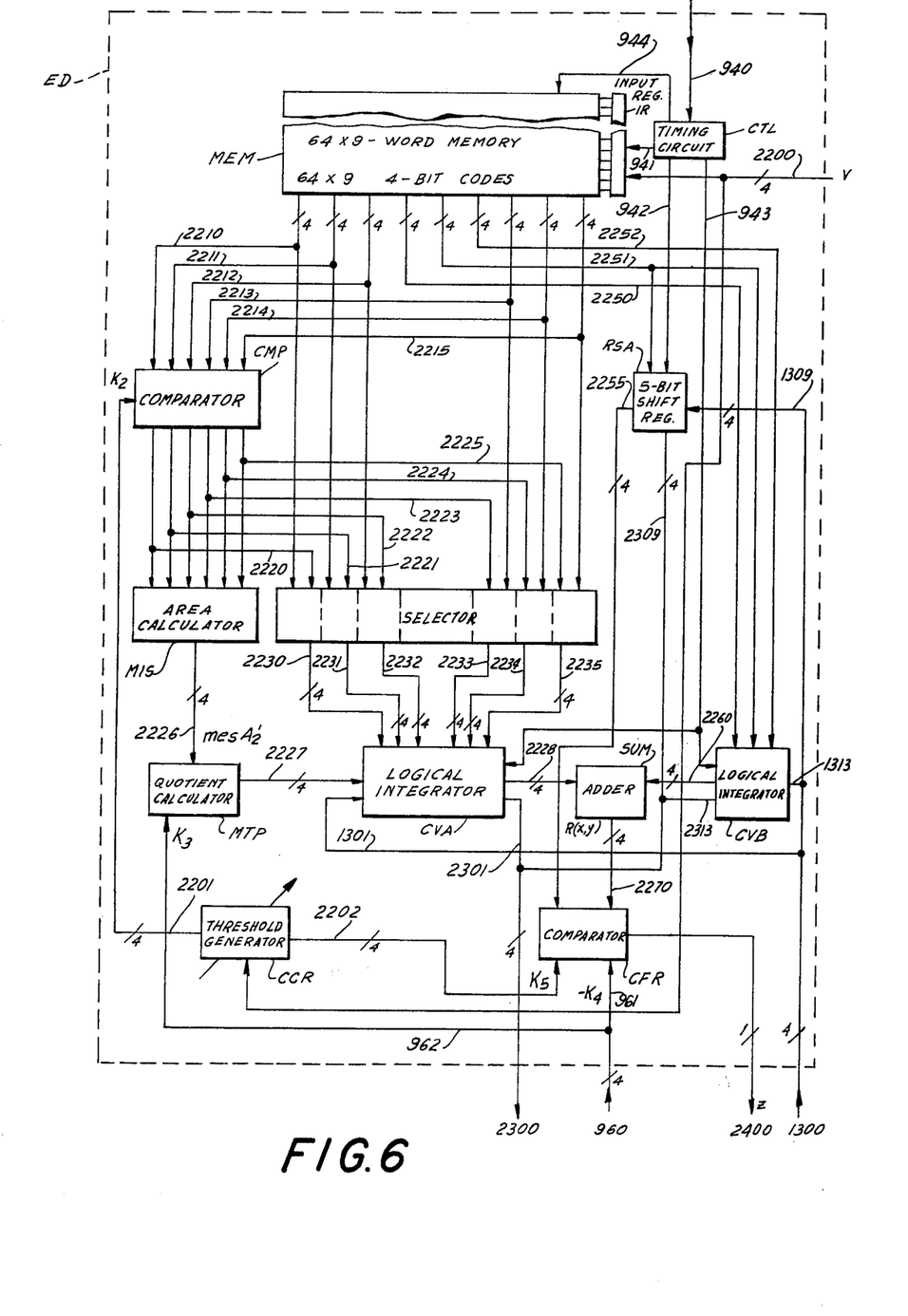
FIG. 6 is a more detailed diagram of a digital processor forming part of the system.

Reference will now be made to FIG. 6 which shows the processor ED with its input multiple 2200, output lead 2400, timing conductors 940 and 960 as well as incoming and outgoing interchannel links 1300 and 2300.

A memory MEM comprises an array of 64×9 stages for the storage of as many 4-bit codes $v$ from quantizer CAD. Under the control of a timing circuit CTL, pulsed via multiple 940, the codes appearing in the several phases of a cycle are serially loaded into a 64-stage input register from which they are transferred in parallel into the rightmost column of memory stages, once per cycle, under the control of a timing pulse on a lead 941 extending from circuit CTL. Another such lead 944 controls the concurrent readout of nine codes from as many columns of memory MEM, during each phase, into respective multiples 2210 – 2215 and 2250 – 2252. A square of 9×9 memory stages, therefore, contains at any time the codes $v$ related to the 9×9 dots of an area A as shown in FIG. 1, the central point P of this area corresponding to the fifth stage from the bottom of the middle column working into line 2251.

Lines 2210 – 2215 extend to a comparator CMP receiving the parameter K$_2$ via a line 2201 from an adjustable threshold generator CCR which also produces the parameter K$_5$ on a line 2202; each of these parameters also consists of four bits. Threshold generator CCR is connected to a branch of line 2200 to integrate the arriving codes $v$ as a measure of background noise, the parameters $K_2$ and $K_5$ varying as a function of that noise. Comparator CMP energizes any of six output leads 2220 – 2225 whenever the code on a corresponding input line 2210 – 2215 has a numerical value at least equal to that of parameter $K_2$. These output leads terminate on the one hand at an area calculator MIS and on the other hand, in parallel therewith, at respective stages of a selector SLT which also have inputs connected to branches of lines 2210 – 2215 and which let the codes $v$ on these lines pass to extensions 2230 – 2235 thereof only if the corresponding comparator outputs 2220 – 2225 are energized.

Logic circuit MIS determines the parameter mes$A_2'$ by simply counting the number of energized input leads, this parameter being fed via a multiple 2226 to another logic circuit MTP which receives the constant $K_3$ on a lead 962 of multiple 960 and which calculates the quotient ($K'$/mes$A_2'$) of equations (2c′) and (5). This quotient is delivered via a multiple 2227 to a logical integrator CVA also connected to the output lines 2230 – 2235 of selector SLT as well as to a timing lead 943 extending from circuit CTL. A similar arithmetic unit CVB is connected to the stage outputs 2250– 2252 of memory MEM as well as to timing lead 943. An output lead 2301, forming part of outgoing link 2300, transmits to the processor of the next-following channel the data relating to the last eight groups of codes read out from memory MEM via its lateral stage outputs 2210 – 2215 at the end of a cycle inasmuch as this information will be needed by the corresponding calculator of the other processor in determining the field function $\phi$ when the array of dots within area A (FIG. 1) straddles neighboring strip zones of the document as discussed above. For the same purpose, calculator CVB has an output lead 2313 also forming part of multiple 2300 and conveying to the other processor the data relating to the last five groups of codes read out from memory MEM via its central stage outputs 2250 – 2252 at the end of a cycle (the three other code groups are not needed in this instance since they form part of background $A_3$). Conversely, calculators CVA and CVB receive corresponding data from the processor of the immediately preceding channel by way of respective conductors 1301 and 1313 forming part of multiple 1300.

Memory output 2251, which carries the most significant code relating to central point P (FIG. 1), extends also to a 5-bit shift register RSA serving as a 5-phase delay circuit under the control of timing signals on a lead 942 from circuit CTL. Shift register RSA also has input and output connections to adjoining processors via lines 1309 and 2309 forming part of incoming and outgoing multiples 1300 and 2300. The delayed code from register RSA is fed to a comparator CFR by way of a line 2255, this comparator also receiving parameters $-K_4$ and $K_5$ via a line 961 of multiple 960 and the output 2202 of threshold generator CCR. An adder SUM, to which the weighted codes from calculators CVA and CVB are delivered via respective lines 2228 and 2260, generates the response parameter R($x,y$) in conformity with equation (5) on a line 2270 also terminating at comparators CFR. The latter emits the binary output signal $z$ on lead 2400 by carrying out the comparisons expressed by inequalities (4a), (4b) and (4c).

Calculators CVA and CVB, which may be storage circuits of the read-only type, could of course be so programmed or wired as to take into account only those data which relate to the dots of zones $A_2$ and $A_1$, respectively, of FIG. 1.

Memory MEM may consist of nine shift registers with 64 stages of four cells each, loaded in parallel and read out in series. However, a random-access store could be used instead. Naturally, the size of the memory and the distribution of its output lines may be modified according to the number of dots in zones $A_1$ and $A_2$; in a limiting case, the limiting zone $A_1$ may consist of a single elemental area or dot representing the point P of FIG. 1, connected to line 2251.

The purpose of the five-phase delay introduced by circuit RSA is to synchronize the arrival of the most significant code at comparator CFR with the calculation of the response parameter R from the codes of all the memory stages corresponding to the array of dots $A_1$, $A_2$ in FIG. 1.

The constant $K_1$ in inherent in the system according to the relationship $$v(x,y) = K_1 S(x,y) \tag{6}$$

Equation (5), yielding the parameter R($x,y$) which appears in the output 2270 of adder SUM, may be digitally transformed into the simpler formula $$R(x,y) = \frac{1}{mes A_1}\left[\sum_{A_1}^{y}\sum_{A_1}^{x} v(x,y)\right] - \frac{K_3}{mes A_2'}\left[\sum_{A_2'}^{y}\sum_{A_2'}^{x} v(x,y)\right] + K_4 \tag{7}$$

characterizing the operation of circuits CVA, CVB and SUM.

Figure 7:
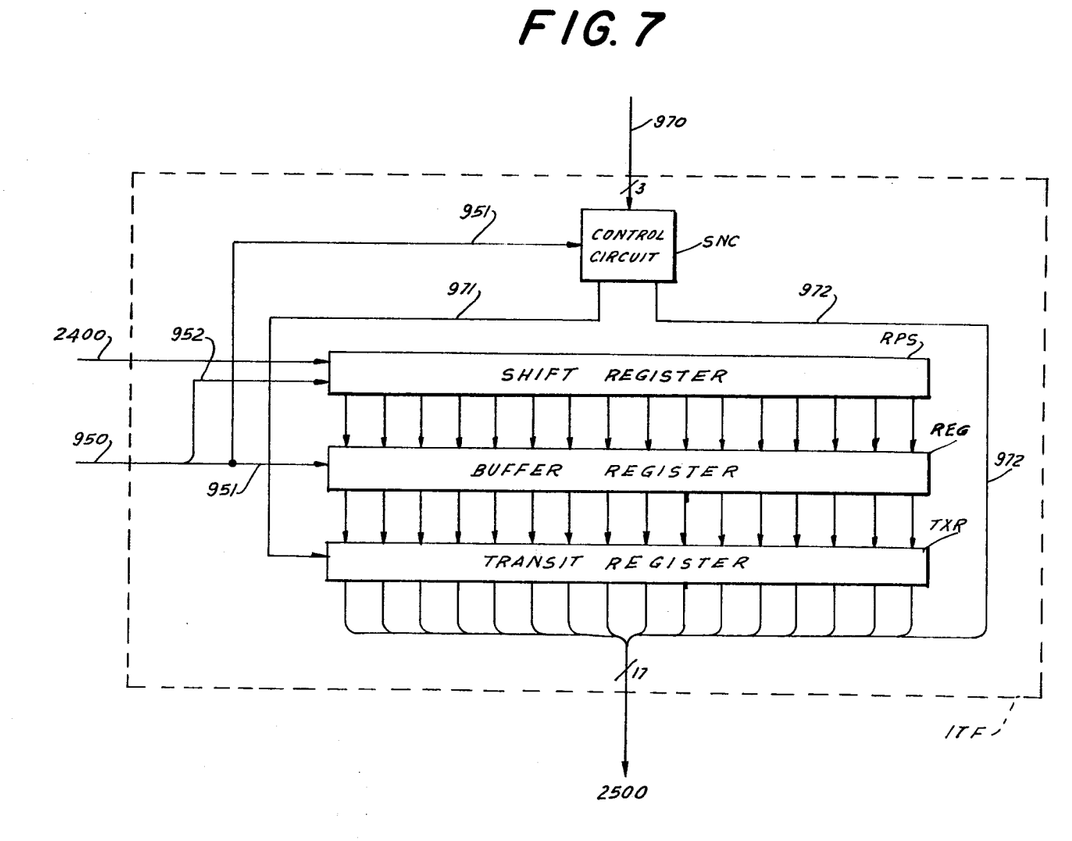
FIG. 7 is a more detailed diagram of an interface unit also shown in block form in FIG. 3.

The binary signals $z$ appearing in consecutive phases on output lead 2400 arrive at a shift register RPS of interface unit ITF as shown in FIG. 7. This shift register has 16 one-bit stages whose contents are read out in parallel to a buffer register REG having the same number of stages. Register REG works into a 16-stage transit register TXR serving for the temporary storage of a 16bit word, four such words being thus generated in a 64-phase cycle. Thus, for example, the several strip zones scanned by respective photosensor sections $FS_I$ etc. (FIG. 8) may each contain four lines of printed matter whose characters are individually resolved into a number of such 16-bit words.

The transfer of bits between registers RPS, REG and TXR takes place in staggered relationship under the control of timing leads 952 and 951 forming part of multiple 950. Lead 951 also extends to a control circuit SNC receiving timing signals via connection 970 from utilization circuit 800 (FIG. 3). The energization of lead 951 informs the circuit SNC that register REG has been fully loaded. Upon receiving a request for data from the utilization circuit, controller SNC sends out a "data ready" signal to circuit 800 over a lead 972 forming part of the multiple 2500. The other conductors of that multiple are the stage outputs of register TXR, the latter being unloaded by a timing signal on a lead 971 which is energized after lead 972.

We claim:

1. A method of electronically reading characters on a carrier moving unidirectionally past a set of photoelectric transducers positioned to scan the carrier surface along a line substantially perpendicular to the direction of carrier motion, said transducers generating individual signal voltages commensurate with the brightness of respective elemental areas of the carrier surface optically registering therewith at a given instant, comprising the steps of:

establishing a succession of operating cycles of a duration so chosen that the advance of said carrier during each cycle is on the order of magnitude of the width of an elemental area as measured along said line, each of said cycles being divided into a multiplicity of phases;

deriving from said signal voltages and from a reference voltage a set of electrical quantities representative of image contrasts existing at said elemental areas;

storing, during each phase, the electrical quantities derived from the signal voltages of a plurality of said transducers optically registering with a two-dimensional array of elemental areas on said carrier, said array including a first zone containing a central elemental area and a second zone composed of several peripheral elemental areas;

separately weighting different groups of stored electrical quantities, relating to elemental areas of said first zone and of said second zone, with a contrast-enhancing field function; and evaluating the most significant electrical quantity stored during any phase, relating to said central elemental area, together with a response parameter synthesized from the weighted electrical quantities to produce a binary output signal.

2. A method as defined in claim 1, comprising the further step of combining all the output signals generated in a single operating cycle into a plurality of multibit words.

3. A method as defined in claim 1 wherein said reference voltage is derived from peak values of said signal voltages.

4. A method as defined in claim 1 wherein said array extends over a square area composed of $n \times n$ elemental areas, said first zone extending over an inner area of $(n-m) \times (n-m)$ elemental areas, said second zone consisting of four outer areas of $(m/z) \times (m/z)$ elemental areas each, said outer areas diagonally adjoining said inner area.

5. A system for electronically reading characters on a unidirectionally moving carrier, comprising:

scanning means including a set of photoelectric transducers;

optical means adjacent the path of said carrier for illuminating said transducers with light from respective elemental areas of the carrier surface adjoining one another along a line substantially perpendicular to the direction of carrier motion, said transducers generating individual signal voltages commensurate with the brightness of said respective elemental areas;

timing means establishing a succession of operating cycles of a duration so related to the speed of said carrier that the advance of said carrier during each cycle is on the order of magnitude of the width of an elemental area as measured along said line, each of said cycles being divided into a multiplicity of phases;

conversion means connected to said scanning means and to a source of reference voltage for translating said signal voltages into electrical quantities representative of image contrasts existing at said elemental areas;

memory means connected to said conversion means and controlled by said timing means for storing, during each phase, the electrical quantities derived from the signal voltages of a plurality of said transducers illuminated by at two-dimensional array of said elemental areas, said array including a first zone containing a central elemental area and a second zone composed of several peripheral elemental areas;

first and second arithmetic means connected to different stages of said memory means for extracting first and second stored electrical quantities relating to elemental areas of said first zone and said second zone, respectively, and weighting the extracted quantities with a contrast-enhancing field function;

evaluation means connected to said first and second arithmetic means for synthesizing a response parameter from the weighted electrical quantities; and readout means extending from said memory means to said evaluation means for feeding thereto the most significant electrical quantity stored in any phase, relating to said central elemental area, for conversion into a binary output signal under the control of said response parameter.

6. A system as defined in claim 5 wherein said readout means comprises circuitry for delaying the feeding of said most significant quantity to said evaluation means until the extraction of all the electrical quantities relating to elemental areas of said second zone.

7. A system as defined in claim 5 wherein said coding means comprises a digital quantizer.

8. A system as defined in claim 5 wherein said source of reference voltage comprises a peak detector connected to said scanning means.

9. A system as defined in claim 5 wherein said second arithmetic means comprises a threshold generator, comparison means connected to said generator for identifying stored second electrical quantities surpassing the threshold thereof, and summing means connected to said comparison means for calculating the combined area of the elemental areas of said second zone associated with the electrical quantities so identified, said field function including a term inversely proportional to the magnitude of said combined area.

10. A system as defined in claim 9 wherein said generator has an input connected in parallel with said memory means to said coding means for varying said threshold as a function of average image contrast.

11. A system as defined in claim 9 wherein said second arithmetic means further comprises a logical integrator with inputs connected to said comparison means and to said summing means.

12. A system as defined in claim 5 wherein said scanning means comprises a shift register with stage inputs connected to respective transducers for parallel loading by the signal voltages thereof during every cycle under the control of said timing means and for serial unloading in successive phases.

13. A system as defined in claim 5, comprising a plurality of parallel signal channels including respective sections of said scanning means, coding means, memory means, arithmetic means, evaluation means and readout means, the sections of said scanning means comprising subsets of said photoelectric transducers positioned for illumination by contiguous strip zones of said carrier.

14. A system as defined in claim 13, further comprising cross-connections between adjoining sections of said arithmetic means to facilitate an evaluation of said response parameter for arrays of elemental areas straddling a pair of neighboring strip zones.

15. A system as defined in claim 5, further comprising transitory storage means connected to said evaluation means for combining a series of binary output signals, generated in a single operating cycle, into a multibit word read out to a load under the control of said timing means.

* * * * *